(12) United States Patent
Brandt

(10) Patent No.: US 7,378,828 B2
(45) Date of Patent: May 27, 2008

(54) DC-DC CONVERTER HAVING MAGNETIC FEEDBACK

(75) Inventor: Randy L. Brandt, Orange, CA (US)

(73) Assignee: The Boeing Company, Chicago, IL (US)

(*) Notice: Subject to any disclaimer, the term of this patent is extended or adjusted under 35 U.S.C. 154(b) by 167 days.

(21) Appl. No.: 10/985,251

(22) Filed: Nov. 9, 2004

(65) Prior Publication Data

US 2006/0097711 A1 May 11, 2006

(51) Int. Cl.
 *G05F 1/33* (2006.01)
 *G05F 1/12* (2006.01)
 *H01F 21/08* (2006.01)

(52) U.S. Cl. ............... 323/290; 323/247; 323/251; 336/155

(58) Field of Classification Search ............... 323/247, 323/331, 250, 251, 261, 262, 259, 334, 355, 323/332, 356, 290, 328; 363/91, 90, 75, 363/82; 336/155, 12
See application file for complete search history.

(56) References Cited

U.S. PATENT DOCUMENTS

| | | | | |
|---|---|---|---|---|
| 3,443,198 A | * | 5/1969 | Wanlass | 363/75 |
| 4,202,031 A | * | 5/1980 | Hesler et al. | 363/97 |
| 4,210,859 A | * | 7/1980 | Meretsky et al. | 323/331 |
| 4,339,792 A | * | 7/1982 | Yasumura et al. | 363/75 |
| 4,393,157 A | * | 7/1983 | Roberge et al. | 323/355 |
| 4,439,822 A | * | 3/1984 | Cocconi | 363/56.08 |
| 4,620,144 A | * | 10/1986 | Bolduc | 323/331 |
| 5,373,432 A | * | 12/1994 | Vollin et al. | 363/16 |
| 5,534,837 A | | 7/1996 | Brandt | |
| 5,684,678 A | * | 11/1997 | Barrett | 363/17 |
| 6,304,066 B1 | * | 10/2001 | Wilcox et al. | 323/282 |
| 6,469,481 B1 | * | 10/2002 | Tateishi | 323/282 |
| 6,472,852 B1 | * | 10/2002 | Lethellier | 323/259 |
| 6,674,320 B2 | * | 1/2004 | Duffy et al. | 327/555 |
| 6,845,021 B2 | * | 1/2005 | Kanehira et al. | 363/91 |
| 6,933,822 B2 | * | 8/2005 | Haugs et al. | 336/100 |
| 7,026,905 B2 | * | 4/2006 | Haugs et al. | 336/220 |
| 2007/0024255 A1 | * | 2/2007 | Yasumura | 323/267 |

* cited by examiner

*Primary Examiner*—Jeffrey L. Sterrett
*Assistant Examiner*—Harry Behm
(74) *Attorney, Agent, or Firm*—MacPherson Kwok; Chen & Heid LLP; Norman E. Carte

(57) ABSTRACT

A DC-DC converter suitable for multiple converter circuit topologies is disclosed. The DC-DC converter utilizes magnetic feedback of the output load current to provide broad inductance control of a magnetic element, while inhibiting saturation of the switched winding or windings of the magnetic element.

17 Claims, 4 Drawing Sheets

DC-DC CONVERTER HAVING MAGNETIC FEEDBACK

TECHNICAL FIELD

The present invention relates generally to power conditioning, and more particularly, to a DC-DC converter that uses magnetic feedback to maintain a regulated output voltage.

BACKGROUND

DC-DC converters are well known. A DC-DC converter is a circuit for changing unregulated direct current (DC) input voltages into controlled or regulated DC output voltages. DC-DC converters are commonly used in power supplies, where they provide power for voltage sensitive devices.

A typical contemporary DC-DC converter, such as that shown in FIG. 1 and discussed in detail below, comprises a pulse width modulator (PWM) switch that cooperates with a power filter, a reference voltage source, a compensation amplifier and voltage/current feedback circuits to convert an unregulated DC input voltage into a regulated DC output voltage. DC-DC converters are utilized both to step down and step up unregulated DC input voltages.

Various DC-DC converter circuit topologies are known. These topologies are derived from either the basic step-down or step-up DC-DC converters. A step-down DC-DC converter, also known as a buck converter, is utilized to provide a lower DC output voltage than the input voltage. A step-up converter, also known as a boost converter, is utilized to provide a higher DC output voltage than the input voltage. A flyback converter, also known as buck-boost converter, is obtained by cascading a buck converter with a boost converter. Similarly, a boost-buck converter is obtained by cascading a boost converter with a buck converter. Other DC-DC converter topologies, such as those of resonant-link converters, are also known.

Contemporary DC-DC converters require the use of a magnetic element (i.e., a transformer or inductor) having an air gapped core. The air gapped core may be either local or distributed. It provides magnetic energy storage during the on time of the duty cycle controlled pulse width modulator switch. The air gapped core typically requires some minimum volume in order to provide the appropriate functionality for DC-DC converter operation.

As power converters and their associated circuits become more complex, it is desirable to be able to reduce the volume and form factor characteristics of their magnetic elements. Reduction in the size of such magnetic core components is typically achieved by using low profile substrates. It is also desirable to maintain a fast response for control of the DC-DC converter output as a function of load current transient demands.

Thus, it is desirable to provide a low profile DC-DC converter that is suitable for use in a variety of different circuit topologies and that is capable of rapidly compensating for load current variations while providing higher power densities.

SUMMARY

Systems and methods are disclosed herein to provide a low profile, high power density DC-DC converter suitable for use in a variety of different converter circuit topologies and having a rapid response to load variations. According to one aspect, the DC-DC converter of the present invention utilizes magnetic feedback of the output load current of the converter to provide broad inductance control of a magnetic element while preventing saturation of the switched windings of the magnetic element.

More specifically, according to one embodiment the feedback is negative feedback. The feedback varies an inductance of the magnetic element in inverse proportion with respect to DC load current variations. A magnetic element having an orthorary (orthogonal) winding, as well as primary and/or secondary windings, is utilized in the DC-DC converter of the present invention.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The numerous objects and advantages of the present invention may be better understood by those skilled in the art by reference to the accompanying figures in which.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
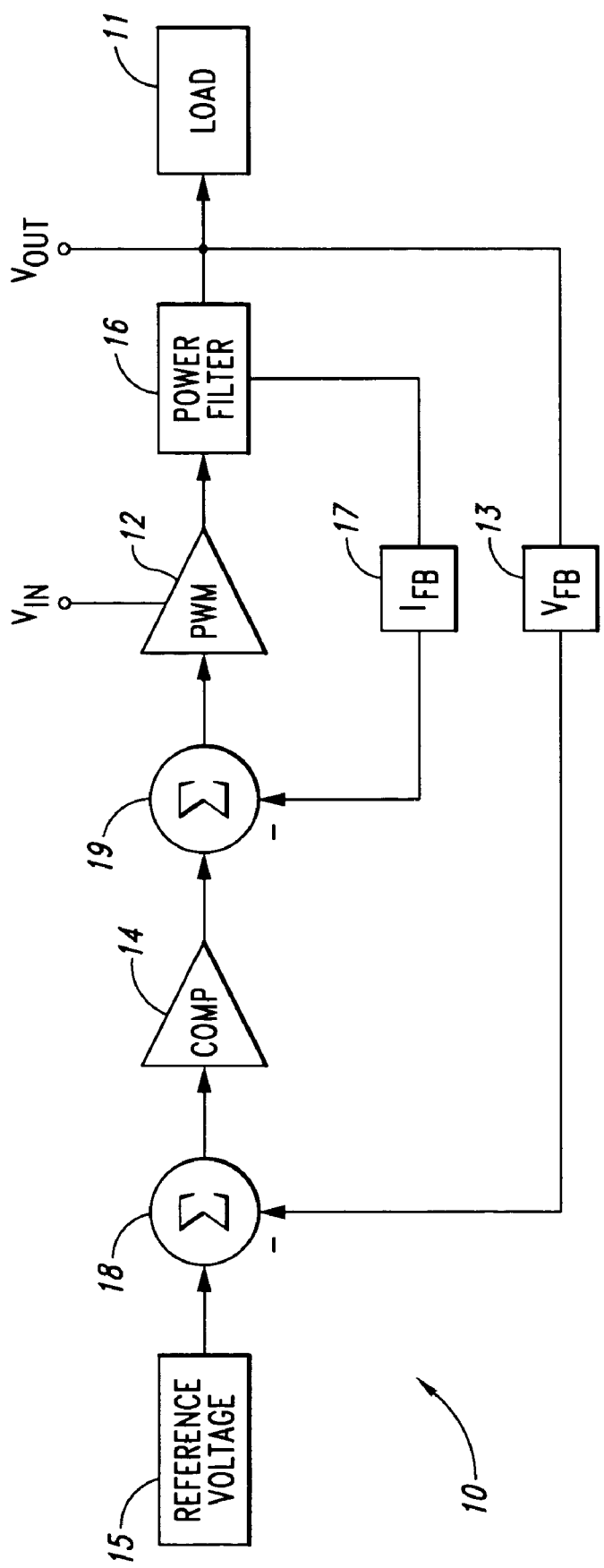
FIG. 1 is a block diagram of a typical contemporary DC-DC converter.

Referring now to FIG. 1, a typical contemporary DC-DC converter 10 is shown. Converter 10 receives a DC input voltage $V_{IN}$ at input terminals to a pulse width modulated (PWM) switch 12. Pulse width modulated switch 12 comprises an active transistor switch and a passive diode switch that cooperate with a power filter 16 to provide a means for energy transfer from the unregulated input $V_{IN}$ to the regulated output $V_{OUT}$ at load 11.

Output voltage regulation is performed by comparing a portion of the output $V_{OUT}$ with a reference voltage 15 via a voltage feedback ($V_{FB}$) circuit 13. The comparison is performed by a summer 18. The difference or error output of summer 18 is then amplified by a compensation amplifier 14.

Current feedback is provided from power filter 16 to summer 19 via a current feedback circuit ($I_{FB}$) 17, where it is compared to the output of compensation amplifier 14. The error output of summer 19 controls pulse width modulator switch 12, so as to regulate the output voltage $V_{OUT}$. Power filter 16 cooperates with pulse width modulator switch 12 to provide regulated voltage and current to load 11.

Referring now to FIGS. 2A-2D, four different exemplary DC-DC converter topologies of the present invention are shown. According to one aspect of the present invention, an inductance controlled magnetic element is coupled so as to provide feedback and the magnetic element is suitable for use in a variety of different DC-DC converter technologies, as shown in these examples. However, it is important to appreciate that such use of a magnetic element is not limited to the illustrated topologies and that the illustrated topologies are shown by way of example only and not by way of limitation.

Figure 2B:
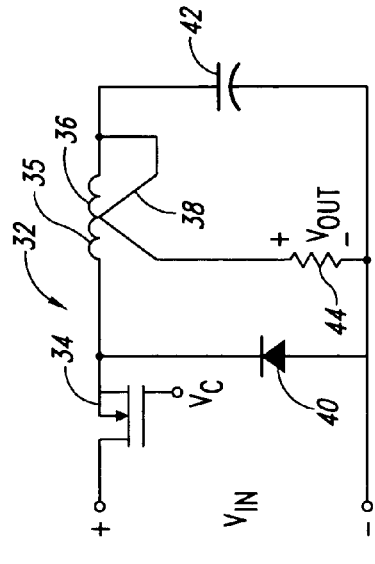
FIG. 2B is a schematic circuit diagram of a buck DC-DC converter topology according to one exemplary embodiment of the present invention.
Figure 2D:
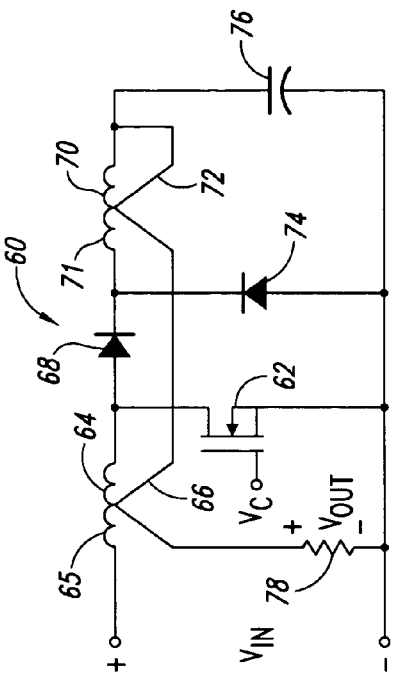
FIG. 2D is a schematic circuit diagram of a boost-buck DC-DC converter topology according to one exemplary embodiment of the present invention.
Figure 2A:
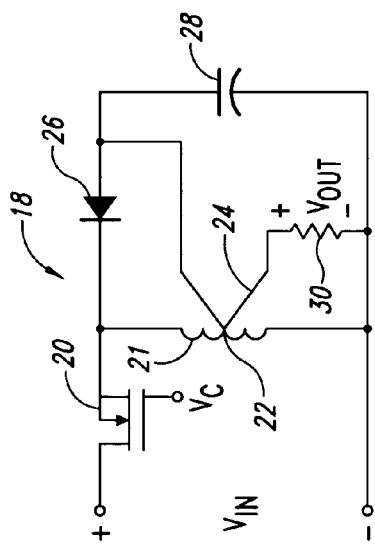
FIG. 2A is a schematic circuit diagram of a buck-boost (flyback) DC-DC converter topology according to one exemplary embodiment of the present invention.

Referring now to FIG. 2A, an exemplary DC-DC converter 18 is formed according to a flyback (buck-boost) configuration. DC-DC converter 18 receives an unregulated DC input voltage $V_{IN}$. A duty cycle controlled pulse width modulator switch 20, such as an enhancement-mode, n-channel, metal-oxide-semiconductor field-effect (MOSFET) transistor, alternately interrupts and restores the DC input current to a main winding 21 of a magnetic element 22. The duty cycle of pulse width modulator switch 20 can be controlled by a pulsed drive voltage $V_C$ that can be derived from a constant frequency generator capable of adjusting the pulsed drive voltage duty cycle in accordance with a control voltage derived from a direct sample of the output voltage and/or output current according to well know principles. An example of such feedback control is shown in FIG. 1.

Magnetic element 22 steps up or steps down the pulse width modulated signal, as determined by the duty cycle of the pulsed drive voltage $V_C$. Magnetic element 22 comprises at least one inductor or main winding 21 that facilitates energy transfer from the unregulated input $V_{IN}$ to the regulated output $V_{OUT}$. Magnetic element 22 also comprises an orthorary (orthogonal) winding 24, which is wound in a direction approximately perpendicular to the direction of the main winding or windings of magnetic element 22.

Such a magnetic element having an orthorary winding is described in U.S. Pat. No. 5,534,837, issued on Jul. 9, 1996 to Randy L. Brandt and assigned to the entity to which the present application is subject to an assignment. U.S. Pat. No. 5,534,837 is hereby explicitly incorporated by reference in its entirety. As used herein, an orthorary winding can be a winding that is substantially perpendicular to another winding or windings, wherein the orthorary winding can be used to control a magnetic characteristic of a core so as to affect operation of the other winding or windings.

Orthorary winding 24 can be utilized to modify or control the permeability of the core medium of magnetic element 22, thereby modifying or controlling the effective inductance of magnetic element 22 and thus controlling its operational characteristics. That is, orthorary winding 24 can be used to control the inductance of main winding 21.

A diode 26 operates as a flyback rectifier to allow the flow of current from main winding 21 of magnetic element 22 to recharge a capacitor 28 during the off cycle of pulse width modulator switch 20 in order to maintain a regulated output $V_{OUT}$. Capacitor 28 functions to provide the load current during the period in which main inductor winding 21 is being charged and, consequently, maintains a regulated output. The time constant associated with capacitor 28 can be large compared to the modulator switching frequency of DC-DC converter 18, so as to better maintain regulation of the output voltage. A load 30 to which the output voltage $V_{OUT}$ of DC-DC converter 18 is applied can be connected to the output of the rectifier 26 through orthorary winding 24 of magnetic element 22.

Load current flows through orthorary winding 24 to operate as a feedback signal to control the primary and/or secondary inductance of magnetic element 22. Changes or fluctuations in the load current through orthorary winding 24 operate to alter the effective core permeability and subsequently the inductance of magnetic element 22 while also preventing saturation of main winding 21 of magnetic element 22.

In some instances, a plurality of main windings may alternatively be used. For example, a transformer having at least one primary winding and at least one secondary winding may alternatively be used according to some circuit topologies.

The change in inductance of main winding 21 of magnetic element 22 can be inversely proportional to the change in the load current passing through orthorary winding 24, thereby favorably modifying the charge on capacitor 28 on the next half cycle following any load perturbations. Thus, connecting load 30 to the output of rectifier 26 through orthorary winding 24 provides negative magnetic feedback of the output load current.

However, current through the load may alternatively be used to provide positive magnetic feedback, if desired. The negative magnetic feedback applied to magnetic element 22 favorably alters the permeability function of magnetic element 22 to extend the amount of load current the magnetic element 22 may handle before reaching saturation, as described herein and in U.S. Pat. No. 5,534,837. Thus, negative feedback can be used for adjusting the switched inductance in inverse proportionality with respect to the DC load current variations and allows the converter to remain at the discontinuous current mode-continuous current mode (DCM-CCM) boundary, resulting in improved efficiencies.

Figure 2C:
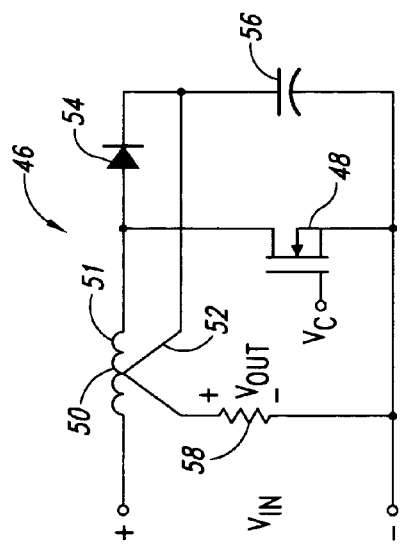
FIG. 2C is a schematic circuit diagram of a boost DC-DC converter topology according to one exemplary embodiment of the present invention.

The circuits of FIGS. 2B-2D function in a manner substantially similar to the circuit shown in FIG. 2A. FIGS. 2A-2D define flyback (buck-boost), buck, boost, and boost-buck DC-DC converter topologies, respectively. Various other DC-DC converter circuit topologies utilizing magnetic feedback in accordance with the present invention disclosed herein may be realized from extrapolation of the DC-DC converter circuit topologies shown in FIGS. 2A-2D.

Referring now to FIG. 2B, another exemplary DC-DC converter 32 is formed according to a buck converter configuration, and is also referred to as a step-down converter. A DC input voltage $V_{IN}$ can be applied to the duty cycle controlled pulse width modulator switch 34, which functions as a switch to periodically interrupt the DC input voltage/current in accordance with a duty controlled pulse drive signal $V_C$, which periodically turns pulse width modulator switch 34 on and off at a constant frequency, but variable duty cycle, in accordance with line voltage and load current variations.

While pulse width modulator switch 34 is on, the input voltage can be applied to the cathode of diode 40, causing charge current to flow in a main winding 35 of magnetic element 36 that is directly proportional to the duty cycle and inductor voltage, and that is inversely proportional to the inductance. This relationship depicts a means by which load variations occurring in orthorary winding 38 alter the core permeability/inductance and, consequently, facilitate an increase or decrease in the current available from DC-DC converter 32. The output voltage $V_{OUT}$ can be applied to load 44 via orthorary winding 38 of magnetic element 36 to provide magnetic feedback to main winding 35 of magnetic element 36, thereby controlling the operational characteristics thereof, as described herein and in U.S. Pat. No. 5,534,837.

While pulse width modulator switch 34 is off, the inductive current derived from the energy stored in main winding 35 of magnetic element 36 turns on rectifier diode 40 and maintains the regulated output voltage on capacitor 42. The output voltage $V_{OUT}$ is the input voltage $V_{IN}$ multiplied by the duty cycle (i.e., a value between 0 and 1) of pulse width modulator switch 34. The output voltage is thereby stepped-down with respect to the input voltage.

Referring now to FIG. 2C, another exemplary DC-DC converter 46 is formed according to a boost converter configuration, and is also referred to as a step-up converter. A DC input voltage $V_{IN}$ can be applied to a series connected main winding 51 of a magnetic element 50. A pulse width modulator switch 48 functions as a duty cycle controlled switch that periodically charges the inductor in accordance with pulsed drive signal.

While pulse modulator switch 48 is on, a magnetic element 50 stores electromagnetic energy from current received from the source of the DC input voltage. While pulse width modulator switch 48 is off, the electromagnetic energy stored in main winding 51 of magnetic element 50 provides current through rectifier diode 54 in order to maintain a charge on capacitor 56 and a regulated output voltage to a load 58. Load 58 can be connected to the cathode of rectifier diode 54 via orthorary winding 52 of magnetic element 50 to provide magnetic feedback to magnetic element 50 thereby controlling the operational characteristics thereof as described herein and in said incorporated U.S. Pat. No. 5,534,837.

Since current discharges from main winding 51 of magnetic element 50 into rectifier diode 54, the voltage produced across main winding 51 additively combines with the DC input voltage to produce an increased output voltage $V_{OUT}$ across load 58. The output voltage level is equal to the input voltage level divided by one minus the duty cycle of modulator 48. The output voltage is thereby a stepped-up version of the input voltage.

Referring now to FIG. 2D, another exemplary DC-DC converter 60 is formed according to a boost-buck configuration, wherein a boost converter followed by a buck converter. A boost-buck converter is utilized to provide either a stepped-up or a stepped-down output voltage which is controlled by the duty cycle of pulse width modulator switch 62. The duty cycle of pulse width modulator switch 62 is a function of the modulating control voltage $V_C$.

A DC input voltage $V_{IN}$ can be applied to a first series connected main winding 65 of a magnetic element 64 followed by a series connected rectifier diode 68, thereby defining a boost converter subcircuit. A second rectifier diode 74 can be connected in parallel with a main winding 71 of a second magnetic element 70 coupled in series with capacitor 76, thereby defining a buck converter subcircuit. The output voltage $V_{OUT}$ can be applied to load 78 via orthorary windings 66 and 72 of magnetic elements 64 and 70, respectively to provide magnetic feedback to both magnetic elements thereby controlling the operational characteristics thereof, as described herein and in U.S. Pat. No. 5,534,837.

The DC transfer function of boost-buck converter 60 is the product of the boost converter DC transfer function and the buck converter DC transfer function. Thus, the output voltage level is the input voltage level multiplied by the duty cycle value divided by one minus the duty cycle value. The output voltage may therefore be either stepped-up or stepped down.

Figure 3:
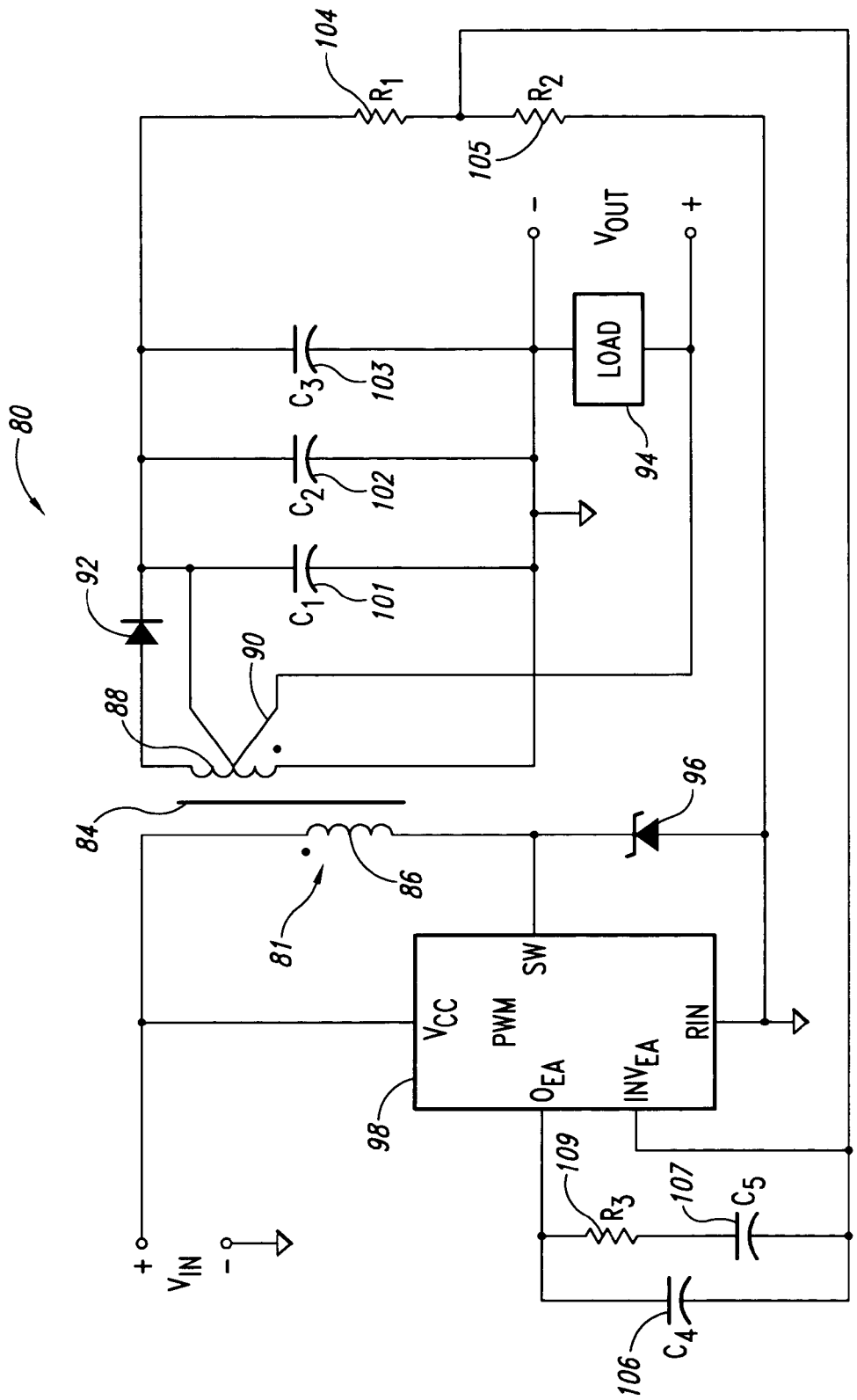
FIG. 3 is a schematic circuit diagram of an exemplary flyback DC-DC converter implementation in accordance with one aspect of the present invention.

Referring now to FIG. 3, an exemplary implementation of a DC-DC converter 80 of the present invention is shown. A DC input voltage $V_{IN}$ can be applied to a primary winding 86 of a transformer 81. Transformer 84 has a core 84, primary winding 86, a secondary winding 88 and an orthorary winding 90. Secondary winding 88 connects to a diode rectifier 92 to produce a pulsed current for charging capacitors 101-103 ($C_1$-$C_3$). A load 94 can be connected to the output of rectifier 92 through orthorary winding 90 to receive a DC output voltage $V_{OUT}$.

A pulse width modulator (PWM) 98 receives input voltage $V_{IN}$ and can be coupled to primary winding 86 of transformer 81. The output of rectifier 92 can be compared to an internal voltage reference of pulse width modulator 98 via internal error amplifier of pulse width modulator 98 using a divider network comprising resistors 104 ($R_1$) and 105 ($R_2$). The filter network comprising resistor 109 ($R_3$), capacitor 106 ($C_4$), and capacitor 107 ($C_5$) provides loop stability compensation for DC-DC converter 80. A zener diode 96 provides voltage transient protection for a duty cycle controlled power transistor switch (pulse width modulator switch) that is internal to pulse width modulator 98.

The DC-DC converter 80 shown in FIG. 3 is an implementation of a flyback (buck-boost) converter topology. The pulse width modulator 98 functions as a voltage/current controlled switch whose duty cycle varies in accordance with changes in output voltage, primary inductor current and input voltage. The constant frequency pulse width modulator 98 varies the duty cycle of the modulated signal. By varying the duty cycle of the modulator signal, the resulting output signal $V_{OUT}$ is substantially held constant. The pulse width modulator thus provides output voltage regulation of DC-DC converter 80 under operational load and input voltage variations.

Thus, according to at least some embodiments, the present invention provides a DC-DC converter suitable for use in a variety of different circuit topologies and which employs a variable inductance such that it is capable of compensating for load current variations while providing comparatively higher power densities. Since a flat plate agile magnetic storage element having orthogonal windings is utilized to perform feedback, the present invention is well suited for miniaturizing multiphase interleaved converters.

Figure 4:
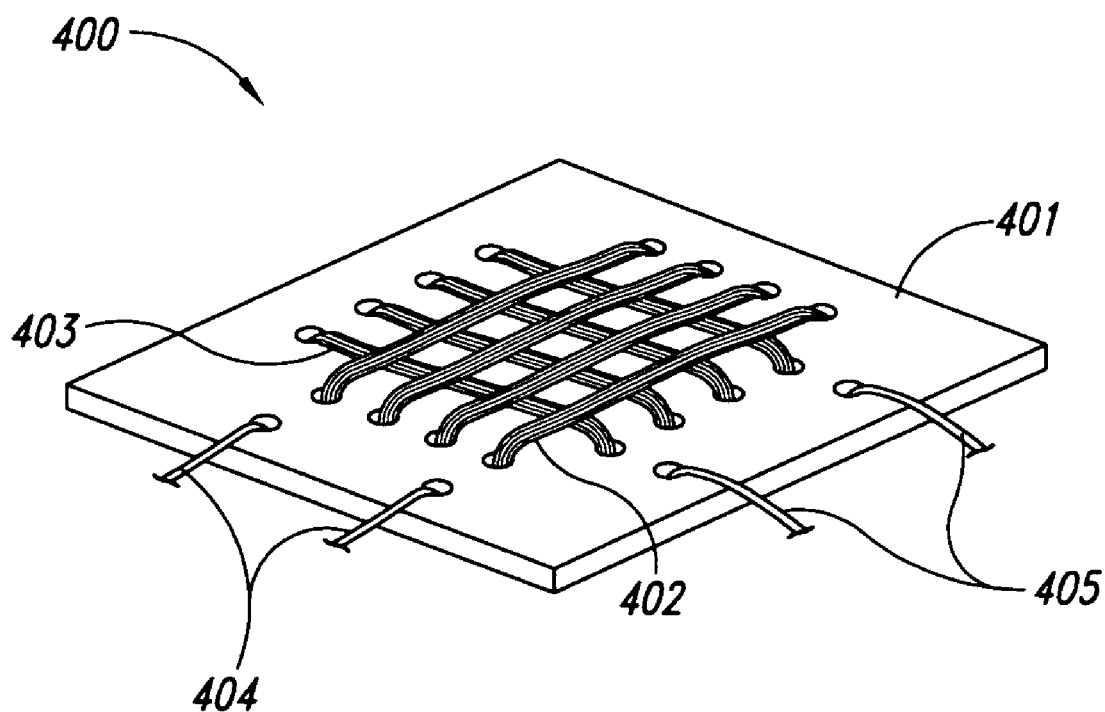
FIG. 4 is a semi-schematic perspective view of an exemplary magnetic element having two orthogonal windings in accordance with one aspect of the present invention.

Referring now to FIG. 4, an exemplary magnetic element 400, formed according to one aspect of the present invention, comprises a magnetically permeable material, such as soft iron core 401. The core 401 can have a low profile (low height compared to contemporary magnetic elements such as inductors and transformers). A main winding 402 and an orthorary winding 403 are formed in the core 401. Leads 404 are provided for the main winding 402 and leads 405 are provided for the orthorary winding 403. The orthorary winding 403 controls an operational characteristic of the main winding 402 to facilitate magnetic feedback, as discussed herein. Plural main windings and/or plural orthorary windings may be utilized, as also discussed herein.

Feedback may be provided by any desired combination of the magnetic element of the present invention, such as those of FIGS. 2-4, and the contemporary voltage feedback loop ($V_{FB}$) and the contemporary current feedback loop ($I_{FB}$) of FIG. 1.

Although some embodiments of the present invention were shown and discussed above as having one main winding and one orthorary winding, the present invention may alternatively have any desired number of main windings (which may function as inductor windings and/or transformer windings) and may have any desired number of orthorary windings.

Embodiments described above illustrate but do not limit the invention. It should also be understood that numerous modifications and variations are possible in accordance with the principles of the present invention. Accordingly, the scope of the invention is defined only by the following claims.

I claim:

1. A voltage regulating DC-DC converter comprising:
   a pulse width modulator switch that receives an input voltage and provides a modulated voltage;
   a power filter in electrical communication with the pulse width modulator switch that filters the modulated voltage to facilitate use thereof by a load; and
   a magnetic element comprising a first winding and a second winding orthogonal to the first winding,
   wherein the second winding is adapted to provide a load current to the load, and
   wherein the magnetic element defines a part of a feedback circuit that uses magnetic feedback effected by the load current through the second winding to vary an inductance of the magnetic element so as to vary current through the first winding and thus effect voltage regulation.

2. The DC-DC convener as recited in claim 1, wherein the magnetic element comprises an inductor of the power filter.

3. The DC-DC converter as recited in claim 1, wherein the magnetic element comprises a law profile magnetic material.

4. The DC-DC converter as recited in claim 1, wherein the magnetic element has a variable inductance that facilitates closed loop feedback control of an output voltage of the DC-DC converter.

5. The DC-DC converter as recited in claim 1, wherein the magnetic element uses magnetic feedback effected by a load current to vary an inductance of the magnetic element while inhibiting saturation of a winding of the magnetic element.

6. The DC-DC converter as recited in claim 1, wherein the magnetic element uses magnetic feedback effected by a load current to vary an inductance of the magnetic element the feedback being negative feedback.

7. The DC-DC converter as recited in claim 1, wherein the pulse width modulator comprises an enhancement mode, n-channel, metal-oxide-semiconductor field-effect transistor.

8. The DC-DC converter as recited in claim 1, wherein the power filter comprises at least one of an inductor and a capacitor.

9. The DC-DC convener as recited in claim 1, wherein the power filter comprises an inductor and a capacitor.

10. The DC-DC converter as recited in claim 1, wherein the power filter comprises an inductor and a capacitor, the capacitor being configured to provide current to a load while the inductor is being charged and the inductor being configured to provide current to the load while the inductor is being discharged.

11. The DC-DC converter as recited in claim 1, further comprising a rectifier coupled so as to allow current to flow in a manner that charges a capacitor and also so as to inhibit the capacitor from discharging through the pulse width modulation switch.

12. A method for performing voltage regulated DC-DC conversion, the method comprising:
   applying a DC input voltage to a pulse width modulated switch;
   pulse width modulating the DC input voltage to provide a pulse width modulated voltage;
   power filtering the pulse width modulated voltage to provide a filtered voltage;
   applying the filtered voltage to a load;
   providing feedback representative of a load current to a low profile magnetic element so as to cause the magnetic element to enhance voltage regulation; and
   wherein the magnetic element uses magnetic feedback effected by an output load current through an orthogonal winding to vary an inductance of the magnetic element.

13. The method as recited in claim 12, wherein the magnetic element comprises an inductor of a power filter.

14. The method as recited in claim 12, wherein the magnetic element comprises a magnetic material and has two orthogonal windings.

15. The method as recited in claim 12, wherein the magnetic element has a variable inductance that facilitates closed loop feedback control of an output voltage of the DC-DC converter.

16. The method as recited in claim 12, wherein the magnetic element uses magnetic feedback effected by an output load current to vary an inductance of the magnetic element while inhibiting saturation of windings of the magnetic element.

17. The method as recited in claim 12, wherein the magnetic element uses magnetic feedback effected by an output load current to vary an inductance of the magnetic element, the feedback being negative feedback.

* * * * *